(12) United States Patent
Behroozi et al.

(10) Patent No.: US 9,093,754 B2
(45) Date of Patent: Jul. 28, 2015

(54) DYNAMICALLY ADJUSTING WIDTH OF BEAM BASED ON ALTITUDE

(71) Applicant: Google Inc., Mountain View, CA (US)

(72) Inventors: Cyrus Behroozi, Palo Alto, CA (US);
Eric Teller, Palo Alto, CA (US);
Richard Wayne DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 13/892,161

(22) Filed: May 10, 2013

(65) Prior Publication Data

US 2014/0333491 A1    Nov. 13, 2014

(51) Int. Cl.
*H01Q 1/28*    (2006.01)
*H01Q 19/13*   (2006.01)
*H01Q 1/12*    (2006.01)

(52) U.S. Cl.
CPC ............. *H01Q 19/13* (2013.01); *H01Q 1/1264* (2013.01)

(58) Field of Classification Search
USPC .................................. 343/706, 761, 839, 840
See application file for complete search history.

(56) References Cited

U.S. PATENT DOCUMENTS

| 3,866,233 | A | 2/1975 | Schmidt |
| 6,182,514 | B1 | 2/2001 | Hodges |
| 6,335,703 | B1 | 1/2002 | Chang et al. |
| 7,224,322 | B1 | 5/2007 | Ghaleb et al. |
| 2004/0156400 | A1* | 8/2004 | Caplan et al. ............. 372/5 |
| 2007/0035461 | A1 | 2/2007 | Nagai |
| 2008/0007451 | A1* | 1/2008 | De Maagt et al. ........... 342/351 |
| 2012/0075149 | A1* | 3/2012 | Palacin et al. .............. 343/711 |

FOREIGN PATENT DOCUMENTS

| JP | 11-168398 A | 6/1999 |
| JP | 2008-154278 A | 7/2008 |

OTHER PUBLICATIONS

International Search Report and Written Opinion of International Application No. PCT/US2014/035085 dated Sep. 3, 2014 (mailed Sep. 3, 2014).

* cited by examiner

*Primary Examiner* — Tan Ho
(74) *Attorney, Agent, or Firm* — McDonnell Boehen Hulbert & Berghoff LLP

(57) ABSTRACT

An antenna includes a radiator and a reflector and has a radiation pattern that is based at least in part on a separation distance between the radiator and the reflector. The antenna includes a linkage configured to adjust the separation distance based at least in part on the altitude of the antenna. The resulting radiation pattern can be dynamically adjusted based on altitude of the antenna such that, while the antenna is aloft and the antenna is ground-facing, variations in geographic boundaries and intensity of the radiation received at ground level are at least partially compensated for by the dynamic adjustments to the radiation pattern.

20 Claims, 11 Drawing Sheets

US 9,093,754 B2

DYNAMICALLY ADJUSTING WIDTH OF BEAM BASED ON ALTITUDE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly.

SUMMARY

Example embodiments relate to a network of balloon-mounted ground-facing antennas for an aerial communication network. Balloons can be formed of an envelope supporting a payload with a power supply, data storage, and one or more transceivers for wirelessly communicating information to other members of the balloon network and/or to wireless stations located on the ground.

Some embodiments of the present disclosure provide an antenna configured to be mounted to a high altitude platform. The antenna can include a radiator, a reflector, and a linkage. The radiator can be configured to emit radiation according to a feed signal. The reflector configured to direct radiation emitted from the radiator such that reflected radiation is characterized by an emission pattern determined at least in part by a separation distance between the radiator and the reflector. The reflector can be configured to be situated such that the emission pattern is directed in a ground-facing direction while the associated high altitude platform is aloft. The linkage configured to adjust the separation distance between the radiator and the reflector according to an altitude of the associated high altitude platform.

Some embodiments of the present disclosure provide a balloon. The balloon can include an envelope, a payload configured to be suspended from the envelope, and an antenna. The antenna can be mounted to the payload and situated so as to be ground-facing while the balloon is aloft. The antenna can include: (i) a radiator configured to emit radiation according to feed signals; (ii) a reflector configured to direct the radiation emitted from the radiator according to a radiation pattern determined at least in part according to a separation distance between the radiator and the reflector; and (iii) a linkage configured to adjust the separation distance between the radiator and the reflector according to an altitude of the antenna.

Some embodiments of the present disclosure provide a method. The method can include emitting radiation from an antenna configured to be mounted to a payload of an associated balloon. The antenna can have an emission pattern determined at least in part by a separation distance between a radiator and a reflector of the antenna. The antenna can be configured to be situated such that the emission pattern is directed in a ground-facing direction while the associated balloon is aloft and the antenna is mounted to the payload. The method can include decreasing the separation distance between the radiator and the reflector responsive to a decrease in altitude of the associated balloon. The method can include increasing the separation distance between the radiator and the reflector responsive to an increase in altitude of the associated balloon.

Some embodiments of the present disclosure provide means for emitting radiation from an antenna configured to be mounted to a payload of an associated balloon. The antenna can have an emission pattern determined at least in part by a separation distance between a radiator and a reflector of the antenna. The antenna can be configured to be situated such that the emission pattern is directed in a ground-facing direction while the associated balloon is aloft and the antenna is mounted to the payload. Some embodiments can include means for decreasing the separation distance between the radiator and the reflector responsive to a decrease in altitude of the associated balloon. Some embodiments can include means for increasing the separation distance between the radiator and the reflector responsive to an increase in altitude of the associated balloon.

These as well as other aspects, advantages, and alternatives, will become apparent to those of ordinary skill in the art by reading the following detailed description, with reference where appropriate to the accompanying drawings.

DETAILED DESCRIPTION

Figure 1:
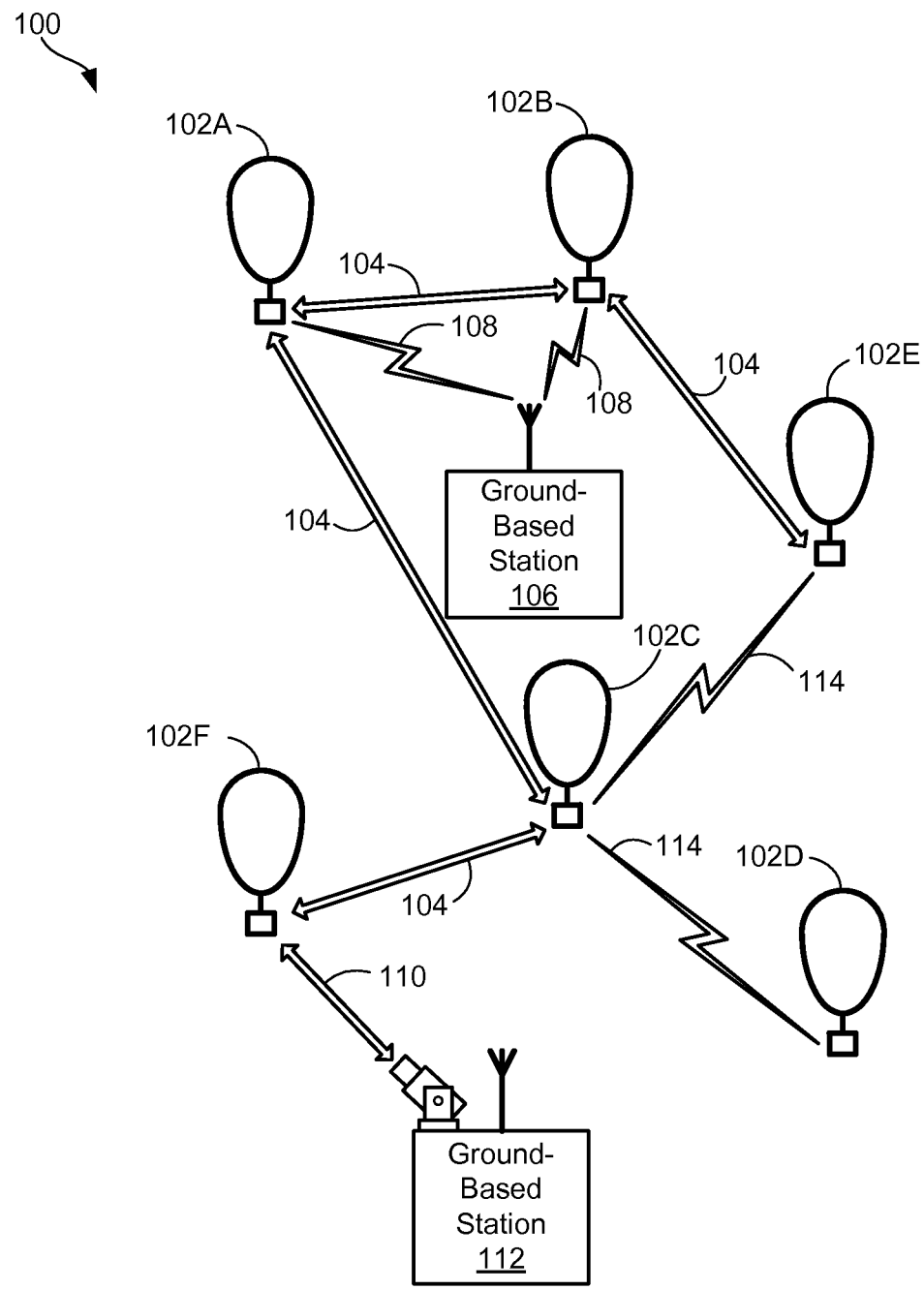
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

1. Overview

Example embodiments relate to an aerial communication network using a plurality of balloons with communication equipment to facilitate wireless communication with ground-based stations and among the balloons. Balloons can be formed of an envelope supporting a payload with a power supply, data storage, and one or more transceivers for wirelessly communicating information to other members of the balloon network and/or to wireless stations located on the ground. To communicate with ground-based stations while aloft, the balloons can be equipped with antennas mounted to the balloon payload so as to be ground-facing.

A ground-facing antenna can include a radiating element situated to radiate toward a reflector. The reflector may be a dish, such as a quasi-parabolic dish that may be spherically invariant. The radiating element can emit signals toward the reflector, which results in radiation emitted from the antenna with a directional emission pattern. The directional emission pattern can be approximated as a cone-shaped region with an apex located near the antenna. The directivity of the emission pattern is thus determined by the breadth or narrowness of the region illuminated by the emission pattern, and can be characterized by an opening angle of the conical surface bounding the illuminated region. The opening angle (and thus the antenna directivity) is determined, at least in part, by the separation distance between the radiating element and the reflector. Generally, a greater separation distance corresponds to a narrower emission pattern, whereas a lesser separation distance corresponds to a broader emission pattern.

In some examples, the emission pattern can be adjusted as the balloon changes altitude. For example, the radiating element in the antenna can be moved closer or further from the reflector to dynamically adjust the width of the emission pattern based on the altitude of the balloon. A control system can determine the altitude of the balloon and then cause the separation distance between the radiating element and the reflector to be adjusted according to the determined altitude.

In some examples, a pressure-sensitive vessel that expands and contracts as the balloon changes altitude based on the atmospheric pressure can be included in a linkage that mounts the radiator and/or reflector to the balloon payload. The expansion and contraction of the vessel can thus expand or contract or the linkage and thereby passively adjust the separation distance as the altitude varies.

The emission pattern may be adjusted to account for variations in the emitted radiation at ground level due to altitude changes of the balloon. Such adjustments may be carried out to cause the width of the emission pattern at ground level to be substantially unchanged even while the balloon altitude varies. Additionally or alternatively, adjustments may be carried out to cause the intensity of the emission pattern at ground level to be substantially unchanged even while the balloon altitude varies.

Each of these specific methods and systems are contemplated herein, and several example embodiments are described below.

2. Example Systems

FIG. 1 is a simplified block diagram illustrating a balloon network 100, according to an example embodiment. As shown, balloon network 100 includes balloons 102A to 102F, which are configured to communicate with one another via free-space optical links 104 (e.g., by sending and receiving optical radiation encoded with data). Moreover, while referred to as "optical," communication on the optical links 104 may be carried out with radiation at a range of wavelengths including radiation outside the visible spectrum, such as infrared radiation, ultraviolet radiation, etc. Balloons 102A to 102F could additionally or alternatively be configured to communicate with one another via radio frequency (RF) links 114 (e.g., by sending and receiving radio frequency radiation encoded with data). Balloons 102A to 102F may collectively function as a mesh network for packet-data communications. Further, at least some balloons (e.g., 102A and 102B) may be configured for RF communications with a ground-based station 106 via respective RF links 108. Further, some balloons, such as balloon 102F, could be configured to communicate via optical link 110 with a suitably equipped ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface of the Earth. At the poles, the stratosphere starts at an altitude of approximately 8 km. In an example embodiment, high-altitude balloons may be generally configured to operate in an altitude range within the stratosphere that has relatively low wind speed (e.g., between 8 and 32 kilometers per hour (kph)).

More specifically, in a high-altitude-balloon network, balloons 102A to 102F may generally be configured to operate at altitudes between 18 km and 25 km (although other altitudes are possible). This altitude range may be advantageous for several reasons. In particular, this altitude region of the stratosphere generally has relatively desirable atmospheric conditions with low wind speeds (e.g., winds between 8 and 32 kph) and relatively little turbulence. Further, while winds between altitudes of 18 km and 25 km may vary with latitude and by season, the variations can be modeled with reasonably accuracy and thereby allow for predicting and compensating for such variations. Additionally, altitudes above 18 km are typically above the maximum altitude designated for commercial air traffic.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include one or more downlink balloons, which could provide a high-capacity air-ground link to connect the balloon network 100 to ground-based network elements.

For example, in balloon network 100, balloon 102F is configured as a downlink balloon. Like other balloons in an example network, the downlink balloon 102F may be operable for optical communication with other balloons via optical links 104. However, the downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, the downlink balloon 102F may additionally be operable for RF communication with ground-based stations 106. In other cases, the downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for wireless communication via RF links and/or optical links with corresponding transceivers situated on balloons in the balloon network 100. Further, a ground-based station may use various air-interface protocols to communicate with balloons 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the present disclosure.

In a further aspect, some or all of balloons 102A to 102F could be additionally or alternatively configured to establish a communication link with space-based satellites. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks for communicating information. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath. Each intermediate balloon (i.e., hop) along a particular lightpath may act as a repeater station to first detect the incoming communication via received optical signals and then repeat the communication by emitting a corresponding optical signal to be received by the next balloon on the particular lightpath. Additionally or alternatively, a particular intermediate balloon may merely direct incident signals toward the next balloon, such as by reflecting the incident optical signals to propagate toward the next balloon.

To operate as a mesh network, balloons 102A to 102F may employ various routing techniques and self-healing algorithms. In some embodiments, the balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network 100.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, the balloon network 100 may be configured as a transparent mesh network. More specifically, in a transparent mesh network configuration, the balloons may include components for physical switching that are entirely optical, without any electrical components involved in the routing of optical signals. Thus, in a transparent configuration with optical switching, signals can travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in the balloon network 100 may implement wavelength division multiplexing (WDM), which may be used to increase link capacity. When WDM is implemented with transparent switching, it may be necessary to assign the same wavelength for all optical links on a given lightpath. Lightpaths in transparent balloon networks are therefore said to be subject to a "wavelength continuity constraint," because each hop in a particular lightpath may be required to use the same wavelength.

An opaque configuration, on the other hand, may avoid such a wavelength continuity constraint. In particular, balloons in an opaque balloon network may include OEO switching systems operable for wavelength conversions along a given lightpath. As a result, balloons can convert the wavelength of an optical signal at one or more hops along a particular lightpath.

2b) Control of Balloons in a Balloon Network

Figure 2:
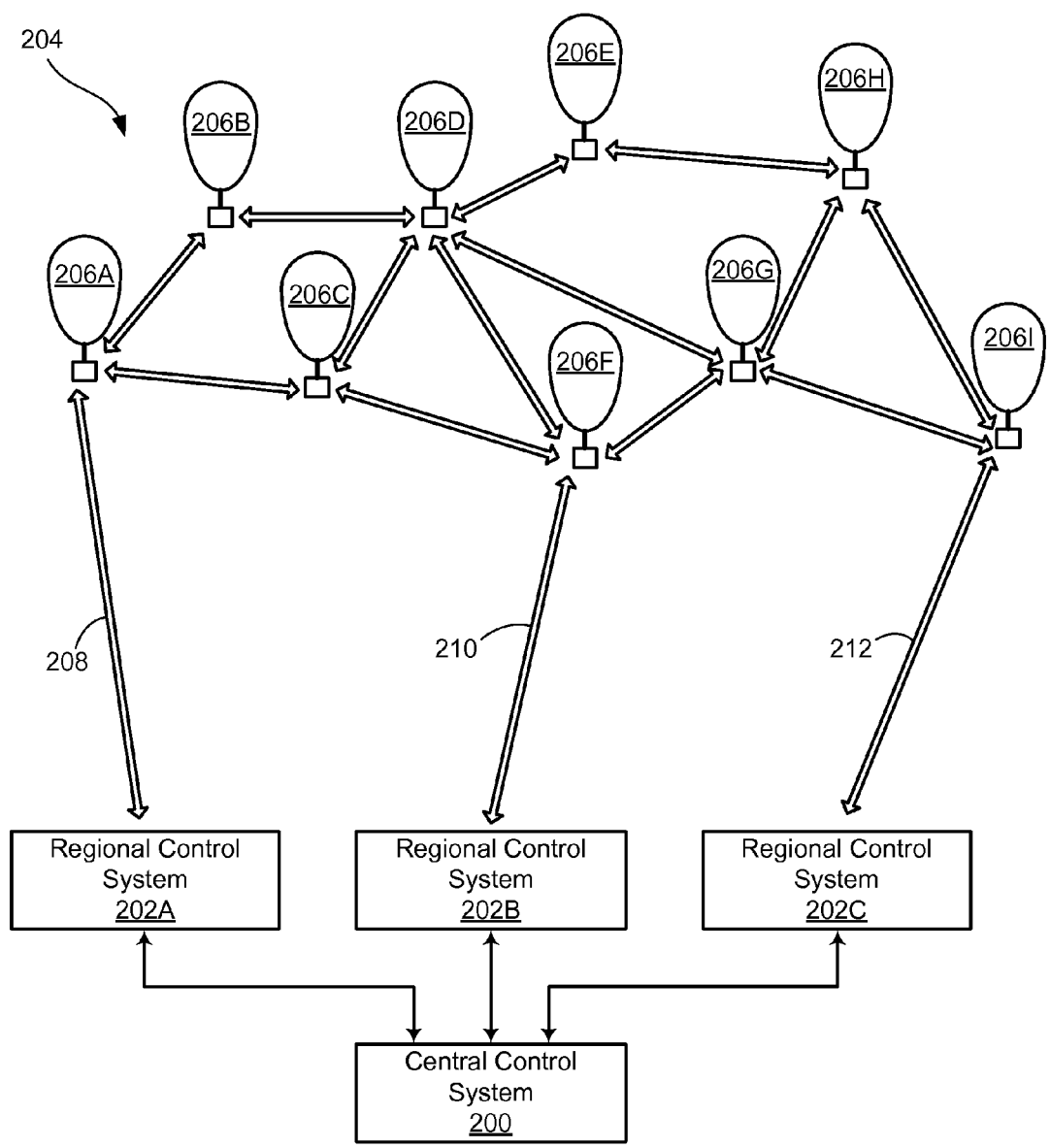
FIG. 2 is a block diagram illustrating a balloon-network control system, according to an example embodiment.

In some embodiments, mesh networking and/or other control functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon.

The regional control systems 202A to 202C may be particular types of ground-based stations that are configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network 204.

Based in part on the overall state of the network 204, the control system 200 may then be used to coordinate and/or facilitate certain mesh-networking functions, such as determining lightpaths for connections, for example. The central control system 200 may determine a current topology (or spatial distribution of balloons) based on the aggregate state information from some or all of the balloons 206A to 206I. The topology may indicate the current optical links that are available in the balloon network and/or the wavelength availability on such links. The topology may then be sent to some or all of the balloons so that individual balloons are enabled to select appropriate lightpaths (and possibly backup lightpaths) for communications through the balloon network 204 as needed.

In a further aspect, the central control system 200 (and possibly regional control systems 202A to 202C as well) may also coordinate certain positioning functions for balloon network 204 to achieve a desired spatial distribution of balloons. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself (e.g., by processing systems situated on payloads of one more balloons in the network 204). For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement balloon-positioning functions that only consider nearby balloons. In particular, each balloon may determine how to move (and/or whether to move) based on its own state and the states of nearby balloons. The balloons may use an optimization routine (e.g., an energy function) to determine respective positions to, for example, maintain and/or move to a desired position with respect to the nearby balloons, without necessarily considering the desired topology of the network as a whole. However, when each balloon implements such an position determination routine, the balloon network as a whole may maintain and/or move towards the desired spatial distribution (topology).

2c) Example Balloon Configuration

Figure 3:
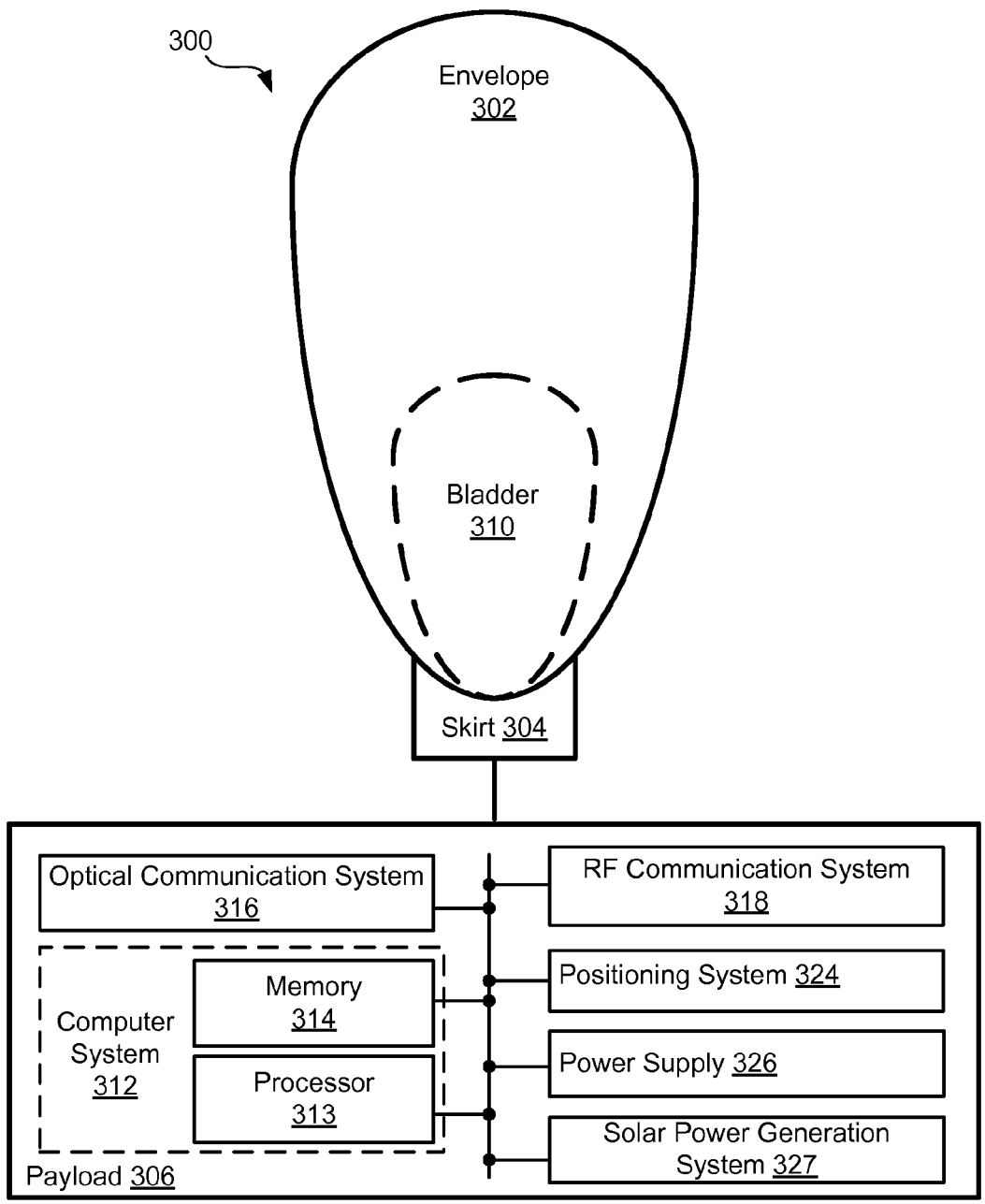
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 illustrates a high-altitude balloon 300, according to an example embodiment. As shown, the balloon 300 includes an envelope 302, a skirt 304, and a payload 306, which is shown as a block diagram.

The envelope 302 and skirt 304 may take various forms, which may be currently well-known or yet to be developed. For instance, the envelope 302 and/or skirt 304 may be made of metallic and/or polymeric materials including metalized Mylar or BoPet. Additionally or alternatively, some or all of the envelope 302 and/or skirt 304 may be constructed from a highly-flexible latex material or a rubber material such as chloroprene. Other materials are also possible. The envelope 302 may be filled with a gas suitable to allow the balloon 300 to reach desired altitudes in the Earth's atmosphere. Thus, the envelope 302 may be filled with a relatively low-density gas, as compared to atmospheric mixtures of predominantly molecular nitrogen and molecular oxygen, to allow the balloon 300 to be buoyant in the Earth's atmosphere and reach desired altitudes. Various different gaseous materials with suitable properties may be used, such as helium and/or hydrogen. Other examples of gaseous materials (including mixtures) are possible as well.

The payload 306 of balloon 300 may include a computer system 312 having a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system, and which may receive optical signals via an optical-communication receiver (e.g., a photodiode receiver system). Further, payload 306 may include an RF communication system 318, which may transmit and/or receive RF communications via an antenna system.

The payload 306 may also include a power supply 326 to supply power to the various components of balloon 300. The power supply 326 could include a rechargeable battery or other energy storage devices. The balloon 300 may include a solar power generation system 327. The solar power generation system 327 may include solar panels and could be used to generate power that charges and/or is distributed by the power supply 326. In other embodiments, the power supply 326 may additionally or alternatively represent other means for producing power.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses). The positioning system 324 may additionally or alternatively include one or more video and/or still cameras, and/or various sensors for capturing environmental data indicative of the geospatial position of the balloon 300, which information may be used by the computer system 312 to determine the location of the balloon 300.

Some or all of the components and systems within payload 306 may be implemented in a radiosonde or other probe, which may be operable to measure environmental parameters, such as pressure, altitude, geographical position (latitude and longitude), temperature, relative humidity, and/or wind speed and/or wind direction, among other information.

As noted, balloon 300 may include an ultra-bright LED system for free-space optical communication with other balloons. As such, optical communication system 316 may be configured to transmit a free-space optical signal by modulating the ultra-bright LED system. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid container holding liquefied and/or gaseous material that is pressurized in excess of the pressure outside the bladder 310. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other gaseous material with density less than typical atmospheric gas (i.e., "lighter-than-air" gasses). The envelope 302 could thus have an associated upward buoyancy force based on its displacement. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or formed of a first material different from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun to selectively heat/cool the gas within the envelope 302 and thereby adjust the density of such gas.

Further, a balloon 306 may include a navigation system (not shown). The navigation system may implement positioning functions to maintain position within and/or move to a position in accordance with a desired spatial distribution of balloons (balloon network topology). In particular, the navigation system may use altitudinal wind data to determine altitudinal adjustments that result in the wind carrying the balloon in a desired direction and/or to a desired location. The altitude-control system may then make adjustments to the density of the balloon envelope 302 to effect the determined altitudinal adjustments and thereby cause the balloon 300 to move laterally to the desired direction and/or to the desired location. Additionally or alternatively, desired altitudinal adjustments may be computed by a ground-based or satellite-based control system and communicated to the balloon 300. In other embodiments, specific balloons in a balloon network may be configured to compute altitudinal adjustments for other balloons and transmit the adjustment commands to those other balloons.

Several example implementations are described herein. It will be understood that there are many ways to implement the devices, systems, and methods disclosed herein. Accordingly, the following examples are not intended to limit the scope of the present disclosure.

3. Ground-Facing Antennas

Figure 4B:
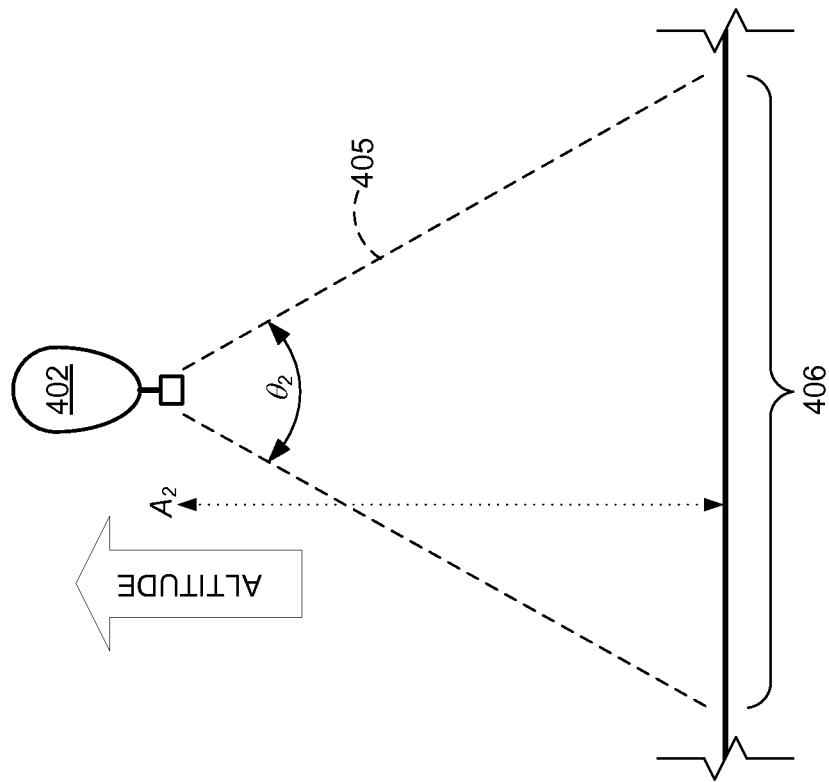
FIG. 4B is a diagram of the balloon in FIG. 4A illuminating the geographic region from a second elevation.
Figure 4A:
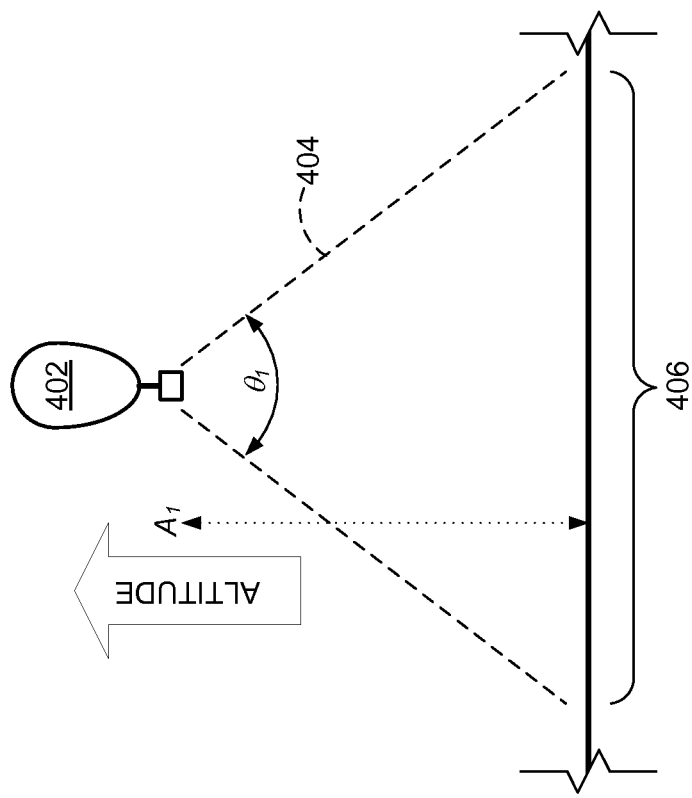
FIG. 4A is a diagram of a balloon with a downward-facing antenna situated to illuminate a geographic region from a first elevation.

FIG. 4A illustrates an example high-altitude balloon 402 with a ground-facing antenna situated to illuminate a geographic region 406 at ground level. The balloon 402 can be similar to the balloon 300 described in connection with FIG. 3 and can include an RF communication system mounted to a payload for operating the ground-facing antenna, similar to the RF communication system 318 in the payload 306 of the balloon 300. The ground-facing antenna emits radiation in an emission pattern 404 that causes signals at ground level to substantially span the geographic region 406 while the balloon is at altitude $A_1$. Similarly, FIG. 4B illustrates the balloon 402 at altitude $A_2$ and illuminating the geographic region 406 by emitting radiation from the ground-facing antenna with an emission pattern 405 so as to substantially span the geographic region 406 at ground level. The emission pattern 404 used at altitude $A_1$ has a characteristic angular span $\theta_1$, while the emission pattern 405 used at altitude $A_1$ has a characteristic angular span $\theta_2$. While the antenna and its adjustable emission patterns 404, 405 are described herein in connection with the high-altitude balloon 402 for purposes of convenience, it is specifically noted that such an antenna with adjustable emission pattern may be mounted to, and used in connection with, a variety of high altitude platforms, such as other lighter-than-air devices and the like.

As illustrated in FIGS. 4A and 4B, the angular span $\theta_1$ can be larger than $\theta_2$, such that the emission pattern 404 spans roughly the same area at ground level (i.e., the area of geographic region 406) as the area spanned by emission pattern 405, even while the first altitude $A_1$ is lower than the second altitude $A_2$. The balloon's antenna can be configured such that the emission patterns 404, 405 (and respective angular spans $\theta_1$, $\theta_2$) at least approximately span the same ground level geographic region 406 regardless of the elevation of the balloon 402. Thus, the balloon 402 can be configured to maintain communication with a substantially fixed geographic region (i.e., the region 406) even as the balloon ascends and descends to various elevations.

Moreover, the more directed emission pattern 405 shown in FIG. 4B, as indicated by the smaller angle $\theta_2$, may have a greater directional gain. As such, the increased directional gain of emission pattern 405 may at least partially compensate for the greater distance between the balloon 402 and the ground level in FIG. 4B (i.e., the altitude $A_2$). For example, the radiation at ground level in the geographic region 406 may have comparable intensity whether from the more broadly emission pattern 404 with the balloon 402 at altitude $A_1$ or from the more narrowly beamed emission patter 405 with the balloon 402 at altitude $A_2$. Generally, the intensity of radiation at ground level from emission pattern 405, with angular span $\theta_2$, may be greater than radiation that would be provided from the same altitude by emission pattern 404, with angular span $\theta_1$, and so the more directed emission pattern 405 thereby at least partially compensates for the altitude-dependent variations in radiation intensity at ground level.

In some examples, the first altitude $A_1$ may be near a low end of a desired stratospheric altitude for the high-altitude balloon 402 (e.g., 18 km), and the second altitude $A_2$ may be near a high end of a desired stratospheric altitude for the high altitude balloon 402 (e.g., 25 km). The angular span $\theta_1$ of the emission patterns 404 can be approximately 90° (e.g., an approximately conical radiation pattern with a 45° half-width), and the angular span $\theta_2$ of the emission pattern 405 can be approximately 70° (e.g., an approximately conical radiation pattern with a 36° half-width).

In a further example, the emission pattern can be adjusted to account for variations in ground-level elevation. For example, the balloon 402 can include an antenna with an emission pattern that is adjusted based on the altitude of the balloon 402, relative to ground level immediately below the balloon 402. In other words, the emission pattern can be adjusted based on the absolute altitude, relative to sea-level, such as detected by ambient pressure, and can additionally or alternatively be adjusted based on altitude, relative to ground. Thus, the balloon 402 may be configured to at least partially compensate for variations in relative altitude (e.g., due to the balloon passing over regions with variations in ground level altitude) in order to maintain an at least approximately constant geographic span and/or intensity level of radiation reaching ground level. In one example, the balloon 402 may traverse over a region with a series of ground elevation changes (e.g., hills, valleys, slopes, flat areas, mountains, etc.). The balloon 402 can dynamically adjust the radiation pattern of its ground-facing antenna to at least partially compensate for altitude-dependent variations in the radiation that reaches the ground from the balloon 402. For example, the emission pattern may be relatively broad, similar to the emission pattern 404 with angular span $\theta_1$ shown in FIG. 4A, while over a high elevation region, and thus relatively low relative altitude. Similarly, the emission pattern may be relatively narrow, similar to the emission pattern 405 with angular span $\theta_2$ shown in FIG. 4B, while over a low elevation region, and thus relatively high relatively altitude.

In some examples, the relative altitude (i.e., distance from ground to balloon 402) can be determined by predetermined ground-level elevation data in combination with position information (e.g., as determined by a GPS receiver or the like) and one or more altitude sensors on the balloon 402 (e.g., altimeters and/or pressure sensors and the like). Upon determining position information for the balloon, such as latitude and longitude coordinates, a mapping database can be accessed to determine a corresponding ground level elevation immediately below the balloon 402. The ground-level elevation, which can be determined by a computer system on the balloon 402 (e.g., similar to the computer system 312 in the payload 306 of the balloon 300) and/or by a remote server in communication with the balloon 402, can then be combined with the altitude of the balloon 402 as determined via the on-board sensors to determine the distance from the balloon 402 to the ground (i.e., the relative altitude). In other examples, the balloon 402 may include sensors configured to directly sense and/or determine the relative altitude of the balloon 402, such as downward facing radar and the like.

In a further example, the emission pattern can be adjusted to account for influences on the radiation from the balloon due to atmospheric effects, such as weather patterns in the troposphere. As an example, particular portions of the spectrum may be sensitive to inclement weather due to increases in radiation attenuating water vapor and/or droplets in the troposphere, for example. To achieve a desired radiation intensity at ground level (e.g., a minimum signal to noise ratio), the emission pattern may be narrowed in response to detecting certain weather patterns. In other words, the radiation pattern may be narrowed so as to increase the directional gain in the illuminated region at ground level, to account for radiation attenuating weather patterns in the atmosphere between ground level and the high-altitude balloon 402. In some examples, such weather-related effects can be accounted for by systems that dynamically detect weather patterns and communicate accordingly with the balloon 402. In other examples, such weather-related effects can be detected directly via sensors on the balloon 402. Additionally or alternatively, such weather conditions (and/or other signal degrading phenomena) can be inferred through detection of degradation in signal strength at stations at ground-level. In other words, the signal to noise ratio (or other measure of signal strength) at ground-based stations can be used as feedback information to dynamically adjust the emission pattern, and thus the direction gain, of the ground-facing antenna on the balloon 402.

Some embodiments of the present disclosure accordingly provide for ground-facing antennas with emission pattern that change based on altitude. The ground-facing antennas can change emission pattern in a manner that at least partially compensates for variations in the radiation at ground level that would otherwise occur due to altitude changes. Such altitude-based compensations in emission pattern can be performed by adjusting the distance between a radiating element and a reflector in the ground-facing antenna. Examples of antennas with adjustable separation distances between radiator and reflectors are described next.

As a preliminary matter, it is noted that the discussion herein generally refers to transmission of radio signals according to adjustable emission patterns (or radiation patterns) to illuminate geographic regions (e.g., the geographic region 406 at ground level illuminated by the emission patterns 404, 405). However, due to the general reciprocity between emission and reception of radio signals in antenna theory and design, it is recognized that the discussion throughout generally has equal application to the reception of signals from a particular ground-level geographic region. That is, the antennas with altitude-dependent adjustable radiation patterns may be used additionally or alternatively to receive signals arriving from the radiation patterns (e.g., from within the geographic region 406 at ground level). In such an example, adjusting the radiation pattern allows the receiving antenna (mounted to the high-altitude balloon) to at least partially compensate for the change in sensitivity that naturally accompanies changes in altitude. For example, such antennas may increase their directional gain at higher altitudes, as shown in FIGS. 4A and 4B.

Figure 4C:
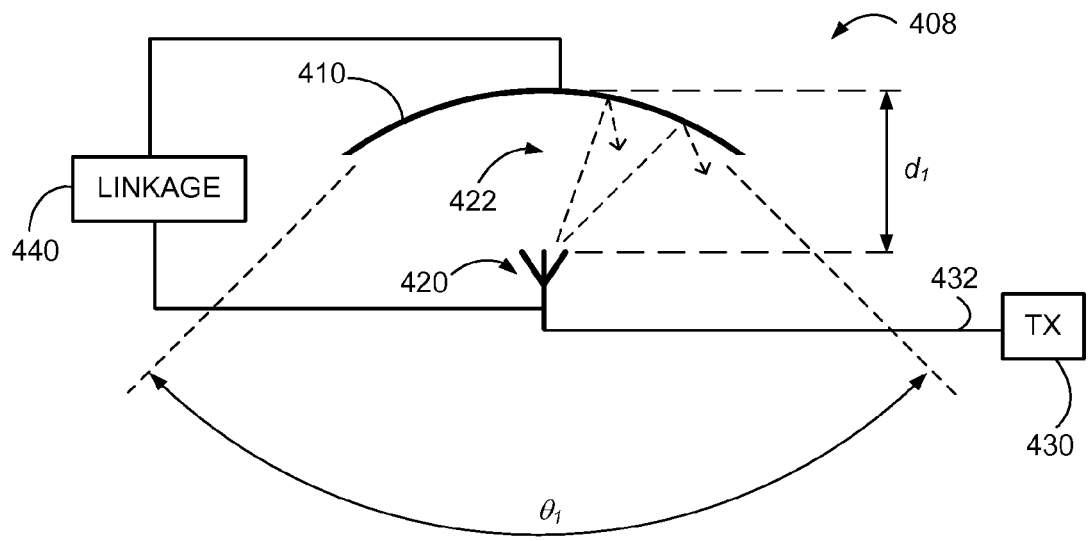
FIG. 4C is a side view diagram of an antenna configured to illuminate a broad emission pattern.
Figure 4D:
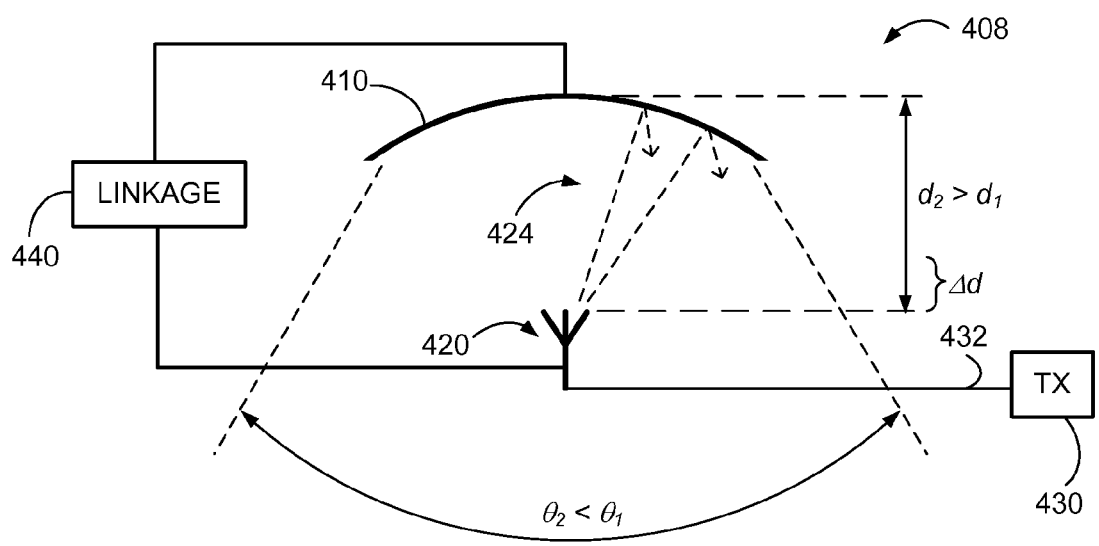
FIG. 4D is a side view diagram of an antenna configured to illuminate a narrow emission pattern.

FIG. 4C illustrates a ground-facing antenna 408 with a radiator 420, a reflector 410, and a linkage 440 that controls the separation distance $d_1$ between the radiator 420 and reflector 410 to provide an emission pattern with angular span $\theta_1$. FIG. 4D illustrates the ground-facing antenna 408 of FIG. 4C, but with a greater separation distance $d_2$ between the radiator 420 and reflector 410, which results in a more directed emission pattern, as indicated by the angular span $\theta_2$. The ground-facing antenna 408 shown in FIGS. 4C and 4D can be mounted to a payload of a high-altitude balloon to radiate downward while the balloon is aloft, similar to the balloon 402 described in connection with FIGS. 4A and 4B with a payload-mounted ground-facing antenna. In an example where the antenna 408 is mounted to the payload of the balloon 402, the configuration of the antenna 408 in FIG. 4C, with separation distance $d_1$ and emission pattern angular span $\theta_1$, can be used to provide the emission pattern 404 with the balloon at altitude $A_1$ (FIG. 4A). Similarly, the configuration of the antenna 408 in FIG. 4D, with separation distance $d_2$ and emission pattern angular span $\theta_2$, can be used to provide the emission pattern 405 with the balloon at altitude $A_2$ (FIG. 4B).

As shown in FIG. 4C, a transmitter 430 is connected to the radiator 420 via a transmission line 432. The transmitter 430 can be included in, or in communication with, a computer system and/or RF communication system within the payload of a balloon to which the antenna 408 is mounted, similar to the computer system 312 and RF communication system 318 described in connection with the balloon 300 in FIG. 3. The transmitter 430 can thus provide input signals to the radiator 420 to cause the radiator 420 to emit corresponding radiation 422, 424, which radiation is then reflected by the reflector 410. Although it is noted that in some embodiments in which the antenna 408 is used to receive incoming radiation, the transmitter 430 may be replaced by a receiver configured to receive information based on harvested radio energy radiating through free space to excite the antenna element 420.

The radiator 420 can be any type of directional or non-directional radiating element suitable for emitting signals according to inputs, such as a horn feed antenna, a bi-pole antenna, etc. The reflector 410 can be a solid or non-solid (e.g., mesh), and may be spherically invariant dish (e.g., the reflective surface of the dish may be equidistant from a common point, or spherical center). In some examples, the reflector 410 may be a cylindrically symmetric dish with a concave curvature defined by a parabolic curvature. In some examples, moreover, the reflector 410 may be a single flat, planar reflective surface, or may be formed of multiple flat panels which may be co-planar or may be combined to create a general concave or convex curvature so as to direct the radiation 422, 424 emitted from the radiator 420 according to a desired pattern.

As shown in FIG. 4C, the radiator 420 is separated from the reflector 410 by a distance $d_1$. The transmitter 430 provides input signals to the radiator 420 to cause the radiator 420 to emit radiation 422 toward the reflector 410. The radiation 422 from the radiator 420 is then reflected by the reflector 410 and directed in an emission pattern with angular span $\theta_1$ (e.g., a conical radiation pattern with apex approximately located at the antenna 408 and opening angle $\theta_1$). The angular span of the resulting emission pattern is determined, at least in part, by the separation distance between the radiator 420 and the reflector 410. Assuming symmetric reflections about incident angles for radiation reflected from the reflector 410, ray tracing radiation from the radiator 420 to the reflector 410 and then outward away from the reflector 410 shows that the angular span of radiation reflected from the reflector 410 is increased at lower separation distances $d_1$, and vice versa. Thus, the configuration of the antenna 408 in FIG. 4D, with separation distance $d_2 > d_1$ by difference $\Delta d$ results in an emission pattern with a decreased angular span $\theta_2$.

A linkage 440 controls the separation distance between the radiator 420 and the reflector 410. The linkage 440 may be a structure that is connected to one or both of the radiator 420 or the reflector 410 and includes adjustable elements, telescoping components, pulleys, wheels, gears, stepper motors, etc., to cause the radiator 410 to move with respect to the reflector 420 or vice versa, and thereby control the separation distance between the two. The linkage 440 may include one or more support arms that connect to the radiator 410 to suspend the radiator 410 above the reflector 420. In some examples, the reflector 410 may be mounted to a fixed portion of the balloon's payload, while the radiator 410 is able to move toward and away from the reflector 420 via the linkage 440. In other examples, the radiator 410 may be mounted to a fixed portion of the balloon's payload, while the reflector 420 is able to move toward and away from the radiator 410 via the linkage 440. Other examples are also possible to allow the linkage 440 to adjust the separation distance between the radiator 410 and the reflector 420. Thus, FIG. 4D may illustrate the linkage 430 in an extended state in which the separation distance $d_2$ is increased by difference $\Delta d$, relative to a compressed state illustrated in FIG. 4C in which the linkage 430 provides a separation distance $d_1$.

The configuration of the radiator 410 and reflector 420 in FIGS. 4C and 4D are provided for purposes of illustration and example only, and not limitation. In other examples, alternative arrangements may be used, such as arrangements with multiple reflection points (e.g., antenna designs incorporating sub-reflectors), and combinations of convex, concave, and/or flat reflectors to provide variable focal lengths and thus variable radiation patterns.

3a) Altitude-Adjustable Linkages

Figure 5A:
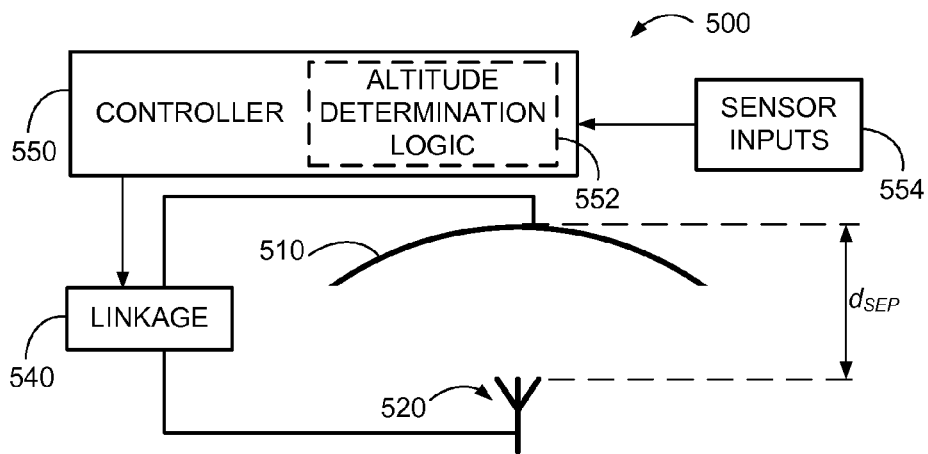
FIG. 5A is a simplified block diagram of an antenna with a dynamically adjustable emission pattern.

FIG. 5A is a simplified block diagram of an antenna 500 with a dynamically adjustable emission pattern. The antenna 500 is configured to mounted to a payload of a high-altitude balloon (or another high altitude platform) in a ground-facing orientation, similar to the antenna described in connection with FIGS. 4A-4D. The antenna 500 includes a radiator 520, a reflector 510, and a linkage 540 that controls the separation distance $d_{SEP}$ between the radiator 520 and the reflector 510. The linkage 540 is configured to adjust the separation distance $d_{SEP}$ according to instructions from a controller 550.

The controller 550 can include a combination of hardware and/or software implemented modules included in the payload of the balloon to which the antenna 500 is mounted. The controller 550 can be configured to determine the altitude of the antenna 500, such as via altitude determination logic 552, which may include computer-readable instructions for being executed by a processor. The controller 550 may thus include (or be included in) a computer system similar to the computer system 312 in the payload 306 of the balloon 300 described in connection with FIG. 3. To determine the altitude of the antenna 500, the controller 550 receives sensor inputs 554. The sensor inputs 554 can include information from pressure and/or temperature sensors (e.g., an altimeter). The sensor inputs 554 can also include information from geo-location navigation and/or communication systems, such as position information derived from time-of-flight measurements to/from reference objects, (e.g., GPS satellites, other high-altitude balloons, ground-based stations, etc.).

In operation, the sensor inputs 554 provide inputs to the controller 550, which inputs are indicative of the altitude of the balloon to which the antenna 500 is mounted. The controller 550 analyzes the information from the sensor inputs 554 to determine the altitude of the balloon (e.g., via the altitude determination logic 552). For example, measurements of pressure and/or temperature, and/or time-of-flight delays to reference objects can be analyzed by the controller 550 (via the altitude determination logic 552) to determine the altitude of the balloon. The controller 550 can then instruct the linkage 540 to adjust the separation distance $d_{SEP}$ between the radiator 520 and the reflector 510, which adjustment results in a change in the emission pattern of the antenna 500. In some examples, the controller 550 operates to provide instructions to the linkage 540 that cause the separation distance $d_{SEP}$ to increase in response to a decreased altitude (as determined by the altitude determining logic 552). Additionally, the controller 550 can provide instructions to cause the separation distance $d_{SEP}$ to decrease in response to an increased altitude (as determined by the altitude determining logic 552).

Moreover, the controller 550 can be configured to additionally or alternatively detect other inputs and cause the separation distance $d_{SEP}$ to be adjusted accordingly. For example, the controller 550 can instruct the linkage 540 to adjust the separation distance based on variations in relative altitude (e.g., distance from ground level to the antenna), variations in weather conditions (e.g., estimates of tropospheric water vapor and/or water droplet density), and/or other variations in received signal conditions at ground-level signal (e.g., as indicated by feedback on received signal strength at ground stations), as described in connection with FIGS. 4A and 4B above.

The linkage 540 can include one or more components configured to adjust mechanical length in response to suitable instructions from the controller 550. For example, the linkage 540 may include telescoping components, elastic components, other moveable components, etc., and associated motors, gears, pulleys, etc., configured to modify the relative position(s) of such moveable components according to the instructions from the controller 550. Moreover, the linkage 540 may include one or more devices configured to provide position feedback information on the state of the linkage 540 (e.g., the relative positions of the various moveable components). The feedback devices can be, for example one or more encoders and/or other position sensor(s). Such feedback devices can then provide feedback position data to the controller 550, which can use the data to estimate the present value of $d_{SEP}$, and then further refine instructions to the linkage on whether and how to adjust the linkage 540. Thus, the instructions to the linkage 540 from the controller 550 may be based on one or both of linkage-position feedback data or altitude-indicative sensor data (554).

Figure 5B:
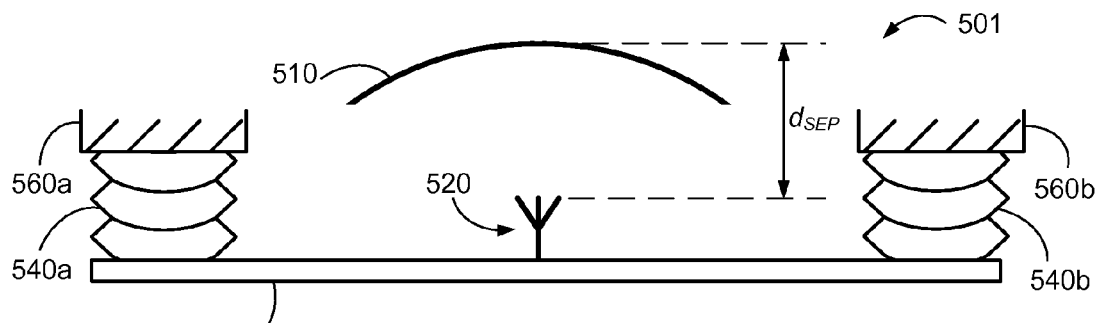
FIG. 5B is a simplified block diagram of another antenna with a dynamically adjustable emission pattern.

FIG. 5B is a simplified block diagram of another antenna 501 with a dynamically adjustable emission pattern. Whereas the antenna 500 described in connection with FIG. 5A actively determines the altitude of the antenna, and then causes the separation distance $d_{SEP}$ to adjust (e.g., by sending suitable electronic signals), the antenna 501 is configured to passively adjust the separation distance $d_{SEP}$ between the radiator 520 and the reflector 510 in response to changes in atmospheric pressure.

In the antenna 501, the radiator 520 is mounted to a supporting structure 545, which may be one or more support arms that suspend the radiator 520 below the reflector 510. For example, the supporting structure 545 may be an arrangement of support arms situated in a plane approximately parallel to the reflector 510. The supporting structure 545 can then be connected to anchor points 560a-b via respective pressure-sensitive vessels 540a-b. The anchor points 560a-b can be structural points connected to the payload of the balloon to which the antenna 501 is mounted, and such anchor points can be substantially fixed in position with respect to the reflector 510, which is also mounted to the payload of the balloon.

The pressure-sensitive vessels 540a-b can be containers with flexible sidewalls that allow the vessels 540a-b to expand and contract along their length. For example, the vessels 540a-b can have end caps each extending perpendicular to their respective lengths, which join to the flexible sidewalls. In FIG. 5B, the supporting structure 545 and anchor points 560a-b can be connected to opposing end caps of the vessels 540a-b, such that the flexible sidewalls extend between the two. By orienting the vessels 540a-b with adjustable lengths between the supporting structure 545 and the anchor points 560a-b, adjusting the length of the pressure-sensitive vessels 540a-b causes a corresponding adjustment in the separation distance $d_{SEP}$ between the radiator 520 and the reflector 510.

The pressure-sensitive vessels 540a-b adjust their lengths in response to changes in external pressure (i.e., atmospheric pressure). The pressure-sensitive vessels 540a-b may include an internal chamber that is substantially evacuated (e.g., near vacuum pressure). As such, the flexible side walls can have sufficient structural rigidity to prevent the vessel from collapsing on itself, even when the chamber is substantially evacuated. The flexible side walls may be formed, for example, of corrugated metal that resists compression, but deforms (e.g., bends) to allow the vessel to contract in length. The amount of compression (and thus mechanical deformation) can thus depend on the amount of external force urging the vessel to a decreased volume, which force can be supplied by ambient pressure. For the vessels 540a-b, which are substantially flexible only along their length, the expansion/contraction in volume is an expansion/contraction in length, and therefore separation distance $d_{SEP}$ between the radiator 520 and the reflector 510. In some examples, another semi-rigid material may be employed additionally or alternatively to corrugated metal to allow the vessel to contract systematically in response to changes in ambient pressure.

By using a pressure-sensitive vessel that is substantially evacuated (e.g., by providing pressure near vacuum in the internal chamber), the vessels 540a-b desirably exhibit greater insensitivity to temperature variations than comparable vessels filled with fluid, such as gas. For example, at high altitudes, a high altitude platform may alternate between receiving large exposures of solar radiation and receiving virtually no radiation, depending on night time or day time. During periods in which the high altitude platform is exposed to the solar radiation (e.g., during daytime hours for a geostationary platform), any gas trapped within the pressure-sensitive vessel would be heated, and undergo expansion. Similarly, during periods lacking exposure to solar radiation (e.g., during nighttime hours for a geostationary platform), such gas would be cooled, and undergo contraction. Such temperature-dependent expansion and contraction of gas within the pressure-sensitive vessels would be substantially independent of variations in altitude and may therefore have to be separately compensated for. Other sources of thermal variations are also possible, such as due to operation of electronics on the payload of the high altitude platform, and other sources. However, evacuating the internal chambers of the pressure-sensitive vessels substantially eliminates temperature-dependent pressure fluctuations of the internal chamber of such vessels.

Alternatively, the internal chamber may be filled with a fluid, such as a gas, and the internal chamber may be in fluid connection with at least one of the end caps of the vessel 540a, such that the pressure within the internal chamber at least approximately balances the external pressure on the pressure-sensitive vessel 540a. The internal chamber may be sealed, such that the pressure within the internal chamber is inversely proportionate to the volume of the vessel 540a. Thus, at low ambient pressure, the pressure-sensitive vessel expands to a large volume to allow the pressure in the internal chamber to at least approximately balance the atmospheric pressure.

Similarly, at high ambient pressure, the pressure-sensitive vessel contracts to a smaller volume. As noted above, gas within the vessels 540a-b, can cause the vessels to expand and contract with dependence on temperature variations separate from altitude-dependent temperature variations, so the separation distance $d_{SEP}$ may then have a separate temperature-based compensation system.

The antenna 501 passively adjusts $d_{SEP}$ based on altitude, because the pressure of the stratosphere generally decreases with altitude, and therefore serves as a proxy for altitude sensitivity. As a result, the antenna 501 has a greater separation distance (and therefore narrower radiation pattern) at greater altitudes where the ambient pressure is lower and the pressure-sensitive vessels 540a-b therefore expand. Similarly, the antenna 501 has a lesser separation distance (and therefore broader radiation pattern) at lesser altitudes where the ambient pressure is greater and the pressure-sensitive vessels 540a-b therefore contract.

Figure 5C:
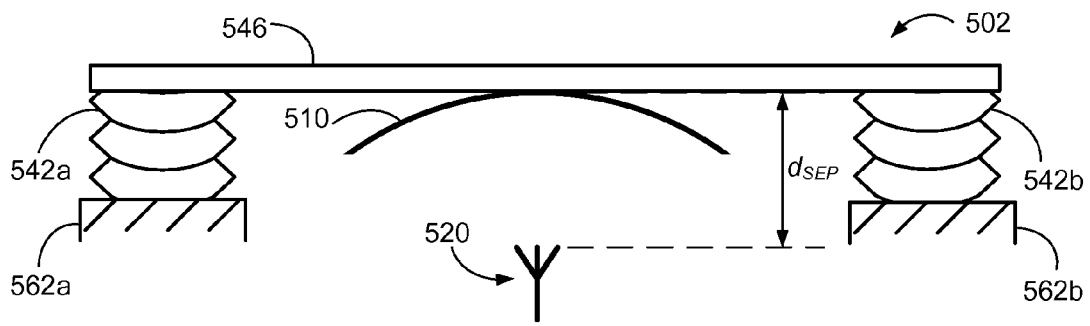
FIG. 5C is a simplified block diagram of another antenna with a dynamically adjustable emission pattern.

FIG. 5C is a simplified block diagram of another antenna 502 with a dynamically adjustable emission pattern. The antenna 502 is similar to the antenna 501, except that the radiator 520 is disposed so as to be substantially fixed with respect to the payload of the balloon to which the antenna 502 is mounted, and the reflector 510 is suspended to move with respect to the radiator 520. The reflector 510 can be connected to a supporting structure 546, which supporting structure is then connected to one or more anchor points 562a-b via pressure-sensitive vessels 542a-b. The anchor points 562a-b can be substantially fixed with respect to the payload of the balloon to which the antenna 502 is mounted (and also with respect to the radiator 520). The separation distance $d_{SEP}$ between the radiator 520 and the reflector 510 is thus automatically adjusted in response to changes in ambient pressure due to expansion/contraction of the pressure-sensitive vessels 542a-b, which expansion/contraction moves the supporting structure 546, and thus the reflector 510, with respect to the anchor points 562a-b. As compared to the antenna 501 in FIG. 5B, the configuration of the antenna 502 shown in FIG. 5C may allow for the radiator 520 to be fixed structurally with respect to the payload of the balloon. As a result, the transmission line for signals feeding the radiator 520 can be connected along a fixed, non-moveable structural element.

In some examples, the pressure-sensitive vessel(s) 540a-b, 542a-b can each be a generally cylindrical container with corrugated (e.g., ribbed) metallic sidewalls, similar to a bellows or an aneroid employed in barometric sensors. While FIGS. 5B and 5C illustrate multiple pressure-sensitive vessels connected to the radiator 520 (via the supporting structure 545) and/or the reflector 520 (via the supporting structure 546), some embodiments of adjustable linkages may include just one pressure-sensitive vessel or more than two pressure-sensitive vessels.

Examples of pressure-sensitive vessels configured as aneroids (e.g., vessels with at least one flexible surface capable of contraction or expansion in response to are described below in connection with FIG. 6. However, some examples may additionally or alternatively include a hollow tube that is arranged to coil/uncoil in response to ambient pressure changes (e.g., a Bourdon tube, etc.) and/or other systems or devices that mechanically respond to variations in ambient pressure. An antenna may be configured to modify its beaming pattern based on the mechanical response of such systems or devices.

Moreover, while some embodiments of the present disclosure may apply to antennas with at least one radiator and at least one reflector, some embodiments may apply to antennas with a variety of other form factors. For example, some embodiments may apply to antennas with multiple radiators (e.g., driven elements) and/or multiple reflectors (e.g., passive elements). In some embodiments a Yagi-type antenna (and/or other antennas including dipole elements and/or parasitic elements) may be configured such that one or more driven elements and/or one or more passive elements (e.g., directors, reflectors, etc.) have spatial separations that depend, at least in part, on a pressure-sensitive vessel (and/or other systems or devices that mechanically respond to variations in ambient pressure). The pressure-dependent relative spacing between the driven elements and/or passive elements may then cause the directivity (e.g., beaming pattern) of such an antenna to be modified based on antenna altitude. Thus, in some examples, a Yagi type antenna (or another antenna with multiple driven elements and/or passive elements) can have relative spacing between elements adjusted in an altitude-dependent manner such that the resulting radiation pattern is adjusted in an altitude-dependent manner (e.g., so as to at least partially compensate for ground level variations in geographical boundaries and/or intensity of the radiation pattern).

3b) Pressure-Sensitive Vessel

Figure 6B:
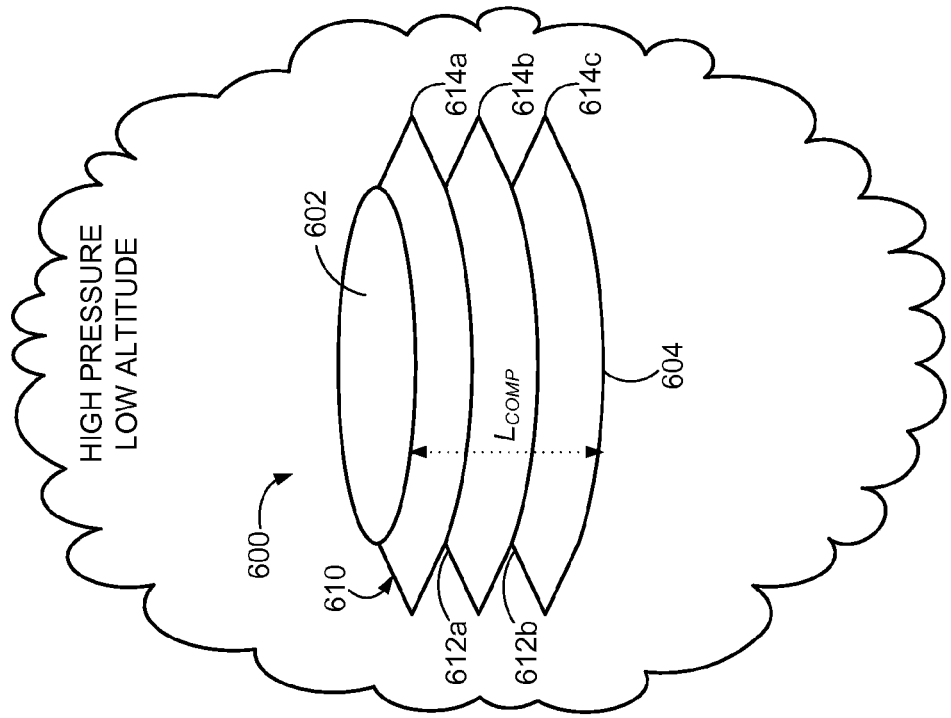
FIG. 6B shows the pressure-sensitive vessel in a contracted state.
Figure 6A:
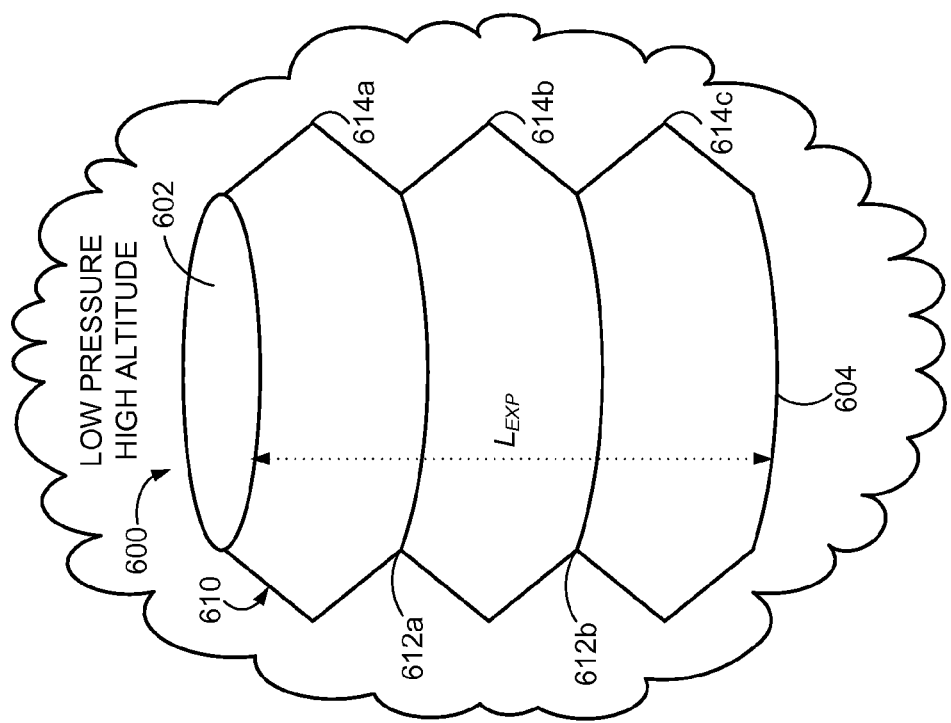
FIG. 6A shows a pressure-sensitive vessel in an expanded state.

FIG. 6A shows a pressure-sensitive vessel 600 in an expanded state. FIG. 6B shows the pressure-sensitive vessel 600 in a contracted state. The pressure-sensitive vessel 600 includes a first end cap 602 and a second end cap 604. A flexible sidewall 610 connects the first and second end caps 602, 604 so as to enclose an inner chamber. The inner chamber can be substantially evacuated, and can have a pressure near vacuum. The flexible sidewall 610 includes a plurality of alternating ridges 614a-c and grooves 612a-b along a direction transverse to the length of the vessel 600, which extends between the two end caps 602, 604. The alternating ridges 614a-c and grooves 612a-b combine to create a corrugated structure that allows the flexible sidewall 610 to expand/contract along the length of the vessel 600. The flexible sidewall 610 and/or the end caps 602, 604 can be formed of a rigid metallic material, such as aluminum, for example. In addition, joints and/or seams in the pressure-sensitive vessel can be sealed with flexible sealants and/or films, such as polymeric materials and the like in order to seal the inner chamber enclosed by the end caps 602, 604 and the flexible sidewall 610.

For example, the vessel 600 can expand/contract by flexing the joints along the corrugated ridges 614a-c and grooves 612a-b of the flexible sidewall 610. In the expanded state, shown in FIG. 6B, the length of the pressure-sensitive vessel 600 (e.g., the distance between the opposing end caps 602, 604) is $L_{EXP}$. In FIG. 6B, in the contracted state, the length of the pressure-sensitive vessel 600 is $L_{COMP}$. By forming the pressure-sensitive vessel 600 of rigid materials configured to expand/contract in one dimension (via the flexible sidewall 610), the pressure-sensitive vessel 600 harnesses pressure-sensitive expansion/contraction of the volume of the vessel 600 to cause the vessel 600 to change length.

In FIG. 6A, the pressure-sensitive vessel 600 can be in a low ambient pressure environment, such as encountered at high altitudes in the stratosphere (e.g., approximately 25 km). The low ambient pressure creates relatively little force on the external walls of the pressure-sensitive vessel 600 and the flexible sidewall 610 expands to cause the vessel 600 to have length $L_{EXP}$. In FIG. 6B, the pressure-sensitive vessel 600 can be in a higher ambient pressure environment, such as encountered at low altitudes in the stratosphere (e.g., approximately 18 km). The higher ambient pressure creates a relatively greater force on the external walls of the pressure-sensitive vessel 600 and the flexible sidewall 610 contracts to cause the vessel 600 to have length $L_{COMP}$.

Generally, the pressure-sensitive vessel 600 can include an internal chamber that is at a low pressure so that gas remaining in the chamber exerts less pressure than the atmosphere on the sidewalls. For example, the internal chamber can be at a vacuum or near vacuum pressure. In operation, when air pressure outside the chamber increases or decreases, the flexible sidewall 610 allows the aneroid (or other vessel) to contract or expand, respectively. In some embodiments, the flexible sidewall 610 acts as a spring to prevent the aneroid from collapsing. As such, suitable materials for this flexible surface include aluminum, stainless steel, brass, copper, Monel, and/or bronze. Other metals or plastics that maintain their spring rate with varied temperatures and multiple expansion and contraction cycles are also contemplated herein. In some embodiments, the aneroid may take the form of: a chamber with a bottom surface, a top surface and at least one collapsible sidewall or other flexible surface, a bellows, a capsule with a flexible diaphragm, and/or a stacked pile of pressure capsules with corrugated diaphragms. The foregoing list is not intended to be exhaustive and is provided merely by way of example.

3c) Flat Reflector Antennas

Figure 7A:
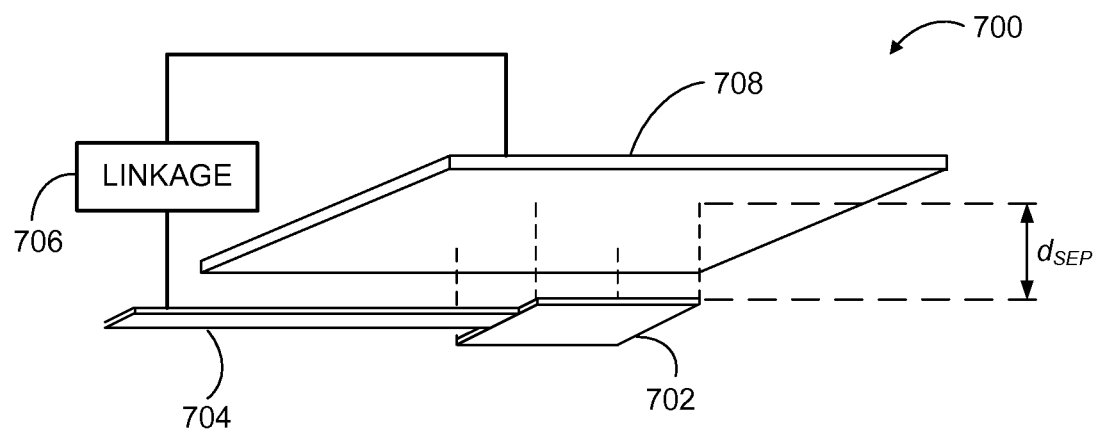
FIG. 7A is a simplified diagram of an antenna with a flat reflector.

FIG. 7A is a simplified diagram of an antenna 700 with a flat reflector 708. The antenna 700 shown in FIG. 7A can be configured to be mounted to a payload of a high-altitude balloon so as to be ground-facing, similar to the antennas described above in connection with FIG. 4-5. A radiating element 702 is situated under the flat reflector 708, and radiates according to input signals (e.g., from a transmitter). The radiating element 702 and reflector 708 can be similar to a patch antenna in some examples. In some examples, the radiating element can be a planar conductive component. The radiating element may be approximately 50 millimeters by 50 millimeters or may have other dimensions, including non-square dimensions (e.g., rectangular, etc.). The reflector 708 can be a planar conductive component plane parallel to the radiating element 702. The reflector may be approximately 300 millimeters by 300 millimeters or may have other dimensions, including non-square dimensions (e.g., rectangular, etc.). A support arm 704 suspends the radiating element 702 with respect to the reflector 708, and can also be used to convey transmission signals to the radiating element 702. As shown in FIG. 7A, the radiating element 702 and/or reflector 708 may be rectangular in shape, and may even be square, for example.

An adjustable linkage 706 connects to the supporting arm and is configured to adjust the separation distance $d_{SEP}$ between the radiating element 702 and the reflector 708 according to the altitude of the antenna 700. The linkage 706 may be an active linkage with moveable components that are operated to adjust the separation distance based on a determined altitude of the antenna, similar to the active adjustable linkages described in connection with FIG. 5A. Additionally or alternatively, the linkage 706 may be a passive linkage that includes one or more pressure-sensitive vessels connected so as to adjust the separation distance $d_{SEP}$ in response to changes in ambient pressure, similar to the passive adjustable linkages described in connection with FIGS. 5B and 5C.

Figure 7B:
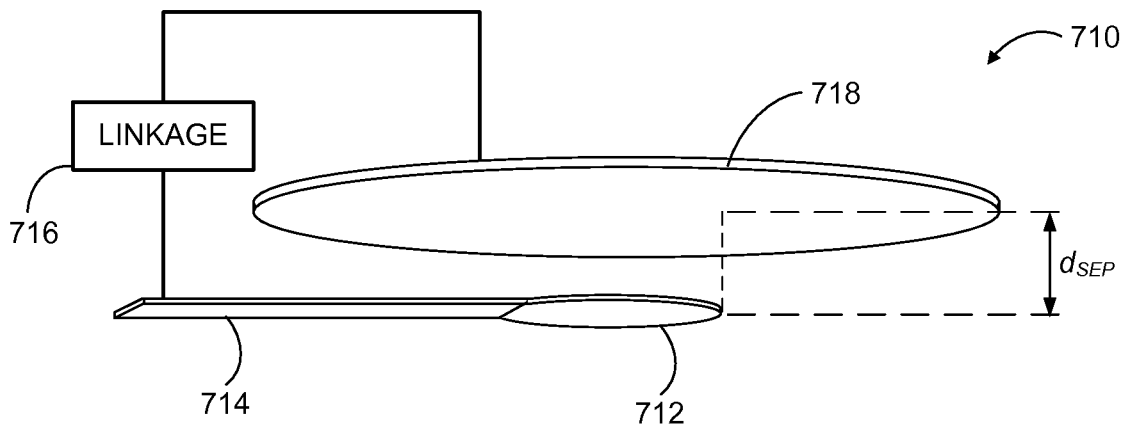
FIG. 7B is a simplified diagram of another antenna with a flat reflector.

FIG. 7B is a simplified diagram of another antenna 710 with a flat reflector 718. The antenna 710 shown in FIG. 7B can be configured to be mounted to a payload of a high-altitude balloon so as to be ground-facing, similar to the antennas described above in connection with FIG. 4-5. A radiating element 712 is situated under the flat reflector 718, and radiates according to input signals (e.g., from a transmitter). The radiating element 712 and reflector 718 can be similar to a patch antenna in some examples. In some examples, the radiating element can be a planar conductive component with an approximate area of 50 millimeters squared. The reflector 718 can be a planar conductive component plane parallel to the radiating element 712 and with an approximate area of 300 millimeters squared. A support arm 714 suspends the radiating element 712 with respect to the reflector 718, and can also be used to convey transmission signals to the radiating element 712. As shown in FIG. 7B, the radiating element 712 and/or reflector 718 may have rounded edges, and may even be circular, for example.

Figure 8A:
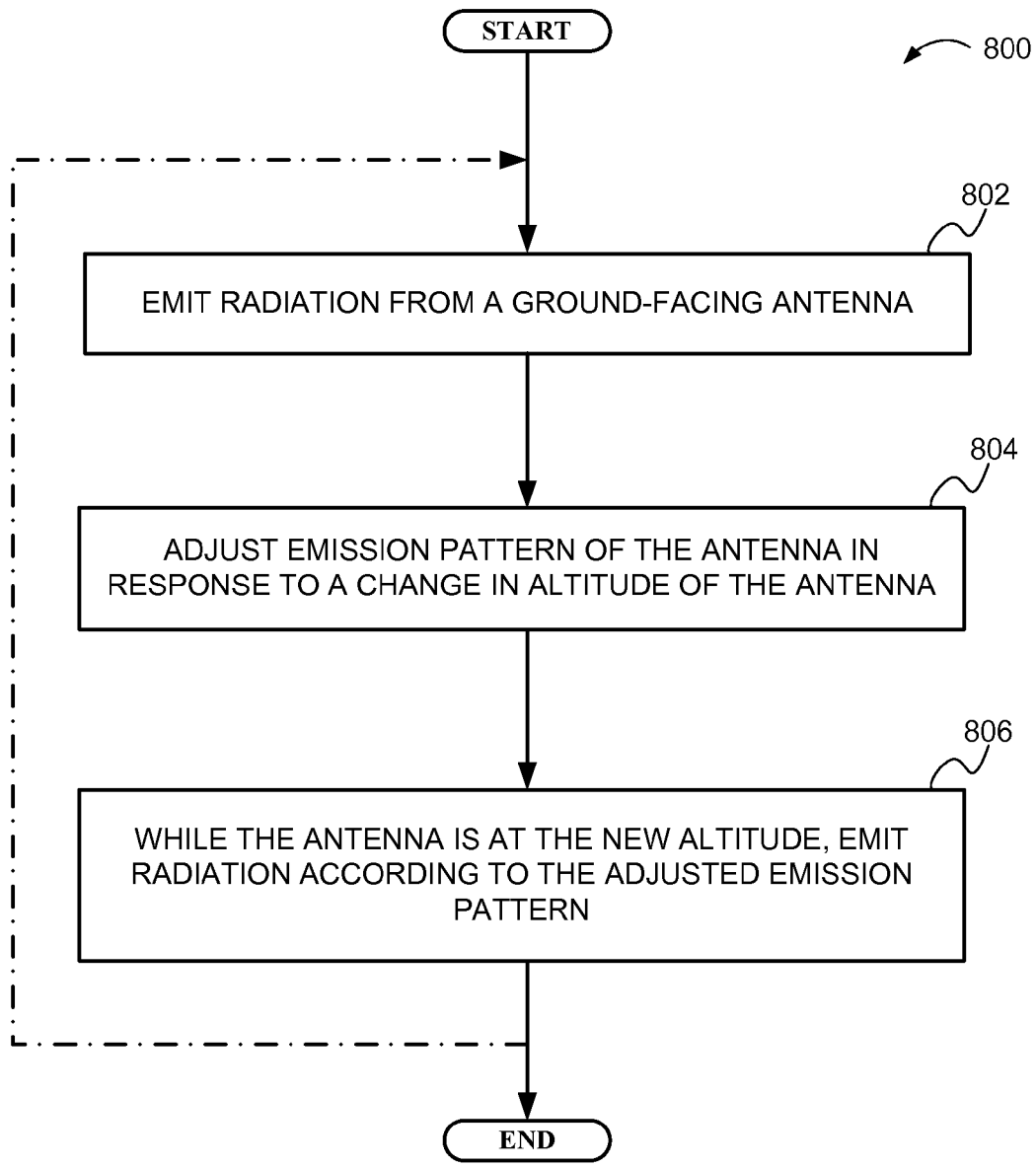
FIG. 8A is a flowchart of a process for dynamically adjusting an antenna emission pattern according to an example embodiment.

An adjustable linkage 716 connects to the supporting arm and is configured to adjust the separation distance $d_{SEP}$ between the radiating element 712 and the reflector 718 according to the altitude of the antenna 710. The linkage 716 may be an active linkage with moveable components that are operated to adjust the separation distance based on a determined altitude of the antenna, similar to the active adjustable linkages described in connection with FIG. 5A. Additionally or alternatively, the linkage 716 may be a passive linkage that includes one or more pressure-sensitive vessels connected so as to adjust the separation distance $d_{SEP}$ in response to changes in ambient pressure, similar to the passive adjustable linkages described in connection with FIGS. 5B and 5C 4. Example Methods FIG. 8A is a flowchart of a process 800 for dynamically adjusting an antenna emission pattern according to an example embodiment. The process 800 illustrated in FIG. 8A may be implemented by any of the ground-facing balloon-mounted antennas described herein alone or in combination with hardware and/or software implemented functional modules. At block 802, radiation is emitted from a ground-facing antenna mounted to a high-altitude balloon. For example, radiation may be emitted from the antenna 408 so as to illuminate a geographic region at ground level, as described in connection with FIG. 4. At block 804, the emission pattern of the antenna is adjusted in response to a change in altitude of the antenna. For example, as described in connection with FIG. 4, the emission pattern of antenna 408 can change from a broad pattern with angular span $\theta_1$ while at altitude $A_1$ to a more directed pattern with angular span $\theta_2$ upon reaching altitude $A_2$. At block 806, the antenna emits radiation according to the adjusted emission pattern while at the new altitude. As indicated by the dashed arrow, the process 800 can optionally be repeated to cause the emission pattern to be intermittently (or perhaps even continuously) updated according to the then present altitude of the antenna.

Moreover, at block 804, the emission pattern can additionally or alternatively be adjusted in response to a change in other aspects influencing signal propagation between ground level and an antenna at high altitude. For example, the emission pattern can be adjusted based on variations in relative altitude (e.g., distance from ground level to the antenna), variations in weather conditions (e.g., estimates of tropospheric water vapor and/or water droplet density), and/or other variations in received signal conditions at ground-level signal (e.g., as indicated by feedback on received signal strength at ground stations), as described in connection with FIGS. 4A and 4B above.

Figure 8B:
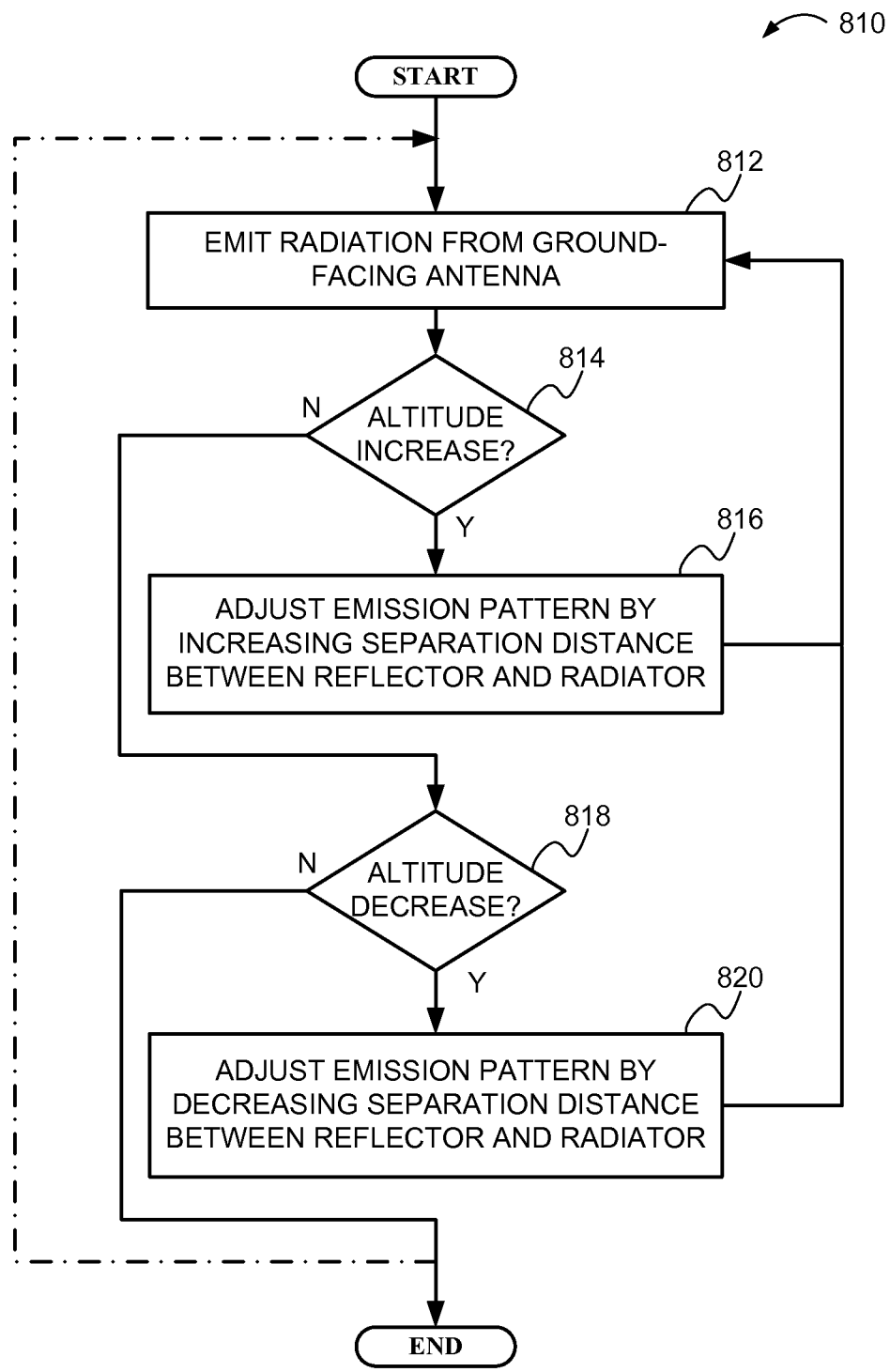
FIG. 8B is a flowchart of a process for dynamically adjusting an antenna emission pattern according to an example embodiment.

FIG. 8B is a flowchart of a process 810 for dynamically adjusting an antenna emission pattern according to an example embodiment. The process 810 illustrated in FIG. 8B may be implemented by any of the ground-facing balloon-mounted antennas described herein alone or in combination with hardware and/or software implemented functional modules. At block 812, radiation is emitted from a ground-facing antenna mounted to a high-altitude balloon. For example, radiation may be emitted from the antenna 408 so as to illuminate a geographic region at ground level, as described in connection with FIG. 4. At block 814, the antenna components and/or associated control systems determine whether the antenna have increased in altitude. If the altitude is increased, the emission pattern of the antenna is adjusted by increasing the separation distance between the reflector and the radiator of the antenna (816). The increased separation distance causes the resulting radiation pattern of the antenna to have a narrower angular span (e.g., to be more directed, similar to the emission pattern 405 with angular span $\theta_2$ in FIG. 4B). The process 810 then returns to block 812 to emit radiation from the ground-facing antenna.

Block 814 may involve altitude determining logic receiving sensor inputs and determining altitude of the antenna, similar to the discussion of the altitude determining logic 552 in FIG. 5A. However, the decision in block 814 may also be implicitly performed by a passive, pressure-sensitive vessel, similar to the passive altitude-sensitive linkages described in connection with FIGS. 5B and 5C that adjust the separation distances between radiator and reflector based on ambient pressure, which is a proxy for altitude.

If block 814 determines no increase in altitude, at block 818, the antenna components and/or associated control systems determine whether the antenna have decreased in altitude. If the altitude is decreased, the emission pattern of the antenna is adjusted by decreasing the separation distance between the reflector and the radiator of the antenna (820). The decreased separation distance causes the resulting radiation pattern of the antenna to have a broader angular span (e.g., to be more dispersed, similar to the emission pattern 404 with angular span $\theta_1$ in FIG. 4A). The process 810 then returns to block 812 to emit radiation from the ground-facing antenna.

Similar to block 814, block 818 may involve altitude determining logic receiving sensor inputs and determining altitude of the antenna, similar to the discussion of the altitude determining logic 552 in FIG. 5A. However, the decision in block 818 may also be implicitly performed by a passive, pressure-sensitive vessel, similar to the passive altitude-sensitive linkages described in connection with FIGS. 5B and 5C that adjust the separation distances between radiator and reflector based on ambient pressure, which is a proxy for altitude.

As indicated by the dashed arrow, the process 810 can optionally be repeated to cause the emission pattern to be intermittently (or perhaps even continuously) updated according to the then present altitude of the antenna.

Figure 9:
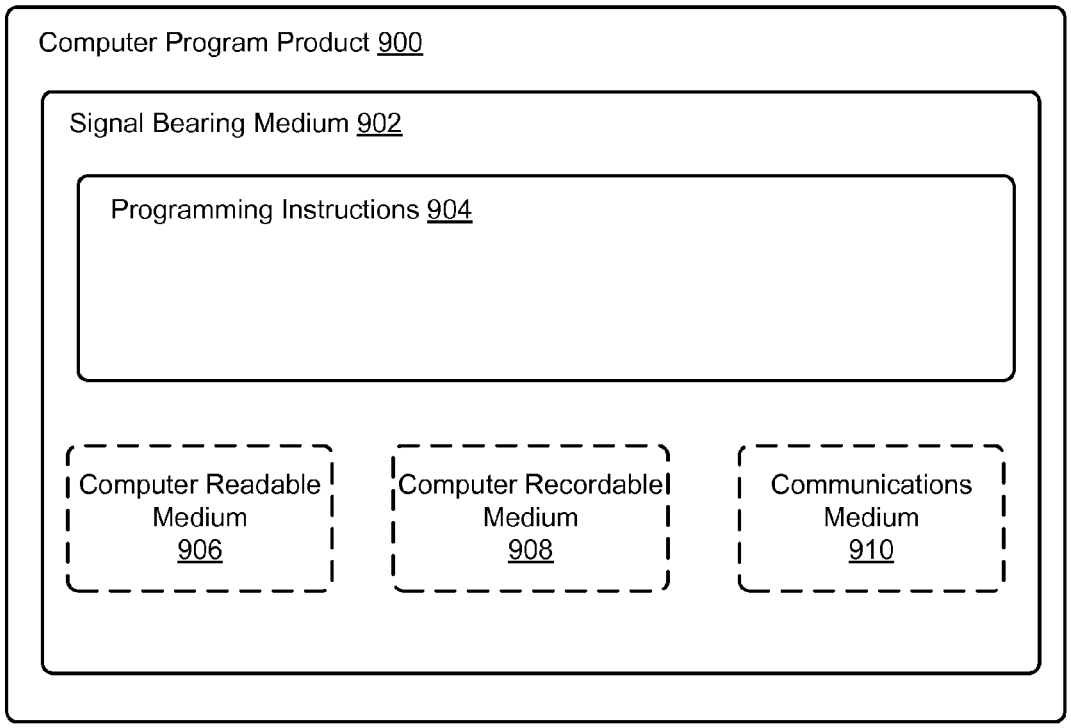
FIG. 9 illustrates a computer readable medium according to an example embodiment.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 may encompass a computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 708, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 312 of FIG. 3 may be configured to provide various operations, functions, or actions in response to the programming instructions 904 conveyed to the computer system 312 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a device, such as the balloon 300 shown and described in reference to FIG. 3. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An antenna configured to be mounted to a high altitude platform, the antenna comprising:
    a radiator configured to emit radiation according to a feed signal;
    a reflector configured to direct radiation emitted from the radiator such that reflected radiation is characterized by an emission pattern determined at least in part by a separation distance between the radiator and the reflector, wherein the reflector is configured to be situated such that the emission pattern is directed in a ground-facing direction while the high altitude platform is aloft; and
    a linkage configured to adjust the separation distance between the radiator and the reflector according to an altitude of the high altitude platform.

2. The antenna according to claim 1, wherein the linkage includes a vessel arranged such that a change in volume of the vessel causes a corresponding change in the separation distance between the radiator and the reflector.

3. The antenna according to claim 2, wherein the vessel is configured such that the volume of the vessel is based on ambient pressure, thereby causing the separation distance to be based at least in part on the ambient pressure.

4. The antenna according to claim 2,
    wherein the vessel includes end caps connected between one or more sidewalls having a plurality of ribs to allow the vessel to change volume, in response to changes in ambient pressure, substantially by expanding or contracting a length of the one or more sidewalls, via the plurality of ribs, thereby changing a distance between the end caps, and wherein the end caps are connected such that the separation distance between the radiator and the reflector corresponds to the distance between the end caps.

5. The antenna according to claim 4, wherein the vessel includes a generally cylindrically-shaped aneroid with at least partially corrugated metallic sidewalls, and wherein an internal chamber of the vessel is substantially evacuated.

6. The antenna according to claim 1, further comprising a controller configured to: (i) determine the altitude of the high altitude platform, and (ii) cause the linkage to adjust the separation distance between the radiator and the reflector based on the determined altitude.

7. The antenna according to claim 1, wherein the linkage is further configured to dynamically adjust the separation distance between the radiator and the reflector by: (i) reducing the separation distance responsive to an increase in altitude of the antenna, and (ii) increasing the separation distance responsive to a decrease in altitude of the antenna.

8. The antenna according to claim 1, wherein the separation distance is dynamically adjusted such that, in a geographical region receiving the emitted radiation at ground level, variations in intensity of the received radiation at ground level due to variations in altitude of the high altitude platform are at least partially compensated for.

9. The antenna according to claim 1, wherein the separation distance is dynamically adjusted such that, in a geographical region receiving the emitted radiation at ground level, variations in a boundary of the geographical region receiving the radiation due to variations in altitude of the high altitude platform are at least partially compensated for.

10. The antenna according to claim 1, wherein the antenna is further configured to receive radiation from a region defined by the emission pattern.

11. The antenna according to claim 1, wherein the antenna is further configured to transmit signals to radio stations at ground level.

12. A balloon comprising:
an envelope;
a payload configured to be suspended from the envelope; and
an antenna mounted to the payload and situated so as to be ground-facing while the balloon is aloft, the antenna including: (i) a radiator configured to emit radiation according to feed signals; (ii) a reflector configured to direct the radiation emitted from the radiator according to a radiation pattern determined at least in part according to a separation distance between the radiator and the reflector; and (iii) a linkage configured to adjust the separation distance between the radiator and the reflector according to an altitude of the balloon.

13. The balloon according to claim 12, wherein the linkage includes a vessel arranged such that a change in volume of the vessel causes a corresponding change in the separation distance between the radiator and the reflector.

14. The balloon according to claim 13, wherein the vessel is configured such that the volume of the vessel is based on ambient pressure, thereby causing the separation distance to be based, at least in part, on the ambient pressure.

15. The balloon according to claim 13,
wherein the vessel includes end caps connected between one or more sidewalls having a plurality of ribs to allow the vessel to change volume, in response to changes in ambient pressure, substantially by expanding or contracting a length of the one or more sidewalls, via the plurality of ribs, thereby changing a distance between the end caps,
wherein the end caps and the one or more sidewalls enclose an inner chamber that is substantially evacuated, and
wherein the end caps are connected such that the separation distance between the radiator and the reflector corresponds to the distance between the end caps.

16. The balloon according to claim 12, further comprising a controller configured to: (i) determine the altitude of the balloon, and (ii) cause the linkage to adjust the separation distance between the radiator and the reflector based on the determined altitude.

17. The balloon according to claim 12, wherein the linkage is further configured to dynamically adjust the separation distance between the radiator and the reflector by: (i) reducing the separation distance responsive to an increase in altitude of the balloon, and (ii) increasing the separation distance responsive to a decrease in altitude of the balloon.

18. A method comprising:
emitting radiation from an antenna configured to be mounted to a payload of an associated balloon, wherein the antenna has an emission pattern determined at least in part by a separation distance between a radiator and a reflector of the antenna, and wherein the antenna is configured to be situated such that the emission pattern is directed in a ground-facing direction while the associated balloon is aloft and the antenna is mounted to the payload;
decreasing the separation distance between the radiator and the reflector responsive to a decrease in altitude of the associated balloon; and
increasing the separation distance between the radiator and the reflector responsive to an increase in altitude of the associated balloon.

19. The method according to claim 18, further comprising:
determining the altitude of the associated balloon; and
causing the linkage to adjust the separation distance between the radiator and the reflector based on the determined altitude.

20. The method according to claim 18,
wherein the linkage includes a vessel arranged such that a change in volume of the vessel causes a corresponding change in the separation distance between the radiator and the reflector; and
wherein the vessel is configured such that the volume of the vessel is based on ambient pressure, thereby causing the separation distance to be based, at least in part, on the ambient pressure.

* * * * *